United States Patent [19]
Lynch et al.

[11] 3,716,777
[45] Feb. 13, 1973

[54] INVERTER POWER SUPPLY EMPLOYING SERIES CONNECTED MULTI-TRANSISTOR SWITCHES

[75] Inventors: George W. Lynch, Tappan, N.Y.; Charles B. Zarowin, Rowayton, Conn.

[73] Assignee: International Business Machines Corporation, Armonk, N.Y.

[22] Filed: Sept. 16, 1971

[21] Appl. No.: 181,028

[52] U.S. Cl. ............................... 321/27 R, 321/45 R
[51] Int. Cl. ............................................. H02m 7/48
[58] Field of Search .......... 321/18, 27, 45; 331/113 A

[56] References Cited

UNITED STATES PATENTS

| | | | |
|---|---|---|---|
| 3,562,623 | 2/1971 | Farnsworth | 321/15 |
| 2,953,754 | 9/1960 | Roesel, Jr. | 321/45 R |
| 2,962,603 | 11/1960 | Bright | 321/45 R |
| 3,105,944 | 10/1963 | Lostetter | 321/45 R X |
| 3,119,057 | 1/1964 | Wilson | 321/18 X |

*Primary Examiner*—William M. Shoop, Jr.
*Attorney*—John J. Goodwin et al.

[57] ABSTRACT

The disclosure describes an inverter circuit which may be used as a power supply. The circuit includes an even number plurality of transistors connected in series with a source of potential connected to the midpoint of the series arrangement. Each of the transistors has a secondary transformer winding connected across its base and emitter which is coupled to a primary transformer driven by an input signal source. The secondary transformer windings are connected through capacitors to a common point, for example, one end of a DC power supply. A resistor is connected across the emitter and collector of each transistor for uniform static voltage distribution and the transistors are connected in series by separate ones of a set primary output transformer windings connected between each transistor. A "poled RC" circuit including a diode, a capacitor and a resistor is connected across each transistor for dynamic voltage distribution. A secondary output transformer winding is also included across which an output voltage is produced which in the preferred embodiment may be a square wave voltage.

1 Claim, 2 Drawing Figures

PATENTED FEB 13 1973

3,716,777

INVENTORS
GEORGE W. LYNCH
CHARLES B. ZAROWIN
BY John J. Goodwin
ATTORNEY

INVERTER POWER SUPPLY EMPLOYING SERIES CONNECTED MULTI-TRANSISTOR SWITCHES

BACKGROUND OF THE INVENTION

1. Field of the Invention

The present invention is in the field of electronic circuits and more particularly, relates to inverter circuits employing multi-transistor switches connected in series.

2. Description of the Prior Art

A prior art inverter is shown in FIG. 1. The two transistors 10 and 12 in this circuit are alternatively driven into saturation by providing sufficient current between the base and emitter. The driving signal which may be A.C. or other signal is obtained from a driver source 14 coupled by means of input transformer 16. Thus, during each half cycle, the DC voltage appears across one-half of the primary of the output transformer 18. Also, since the two halves of the primary winding 18 share its same core, a DC voltage is induced across the other half for a total of twice the DC voltage across the entire output transformer primary 18. Thus, the peak inverse voltage of each transistor must be twice the DC voltage and the power handling capability of the circuit is therefore limited by the two transistors 10 and 12.

SUMMARY

An object of the present invention is to provide an inverter circuit that operates at higher than audio frequency and provides multikilowatt power with high duty cycle using low cost power transistors.

Another object of the present invention is to provide an inverter circuit including a series string of transistors which operate as switches.

Still another object of the present invention is to provide an inverter circuit including static and dynamic voltage distribution.

The foregoing and other objects, features and advantages of the invention will be apparent from the following more particular description of the preferred embodiments of the invention, as illustrated in the accompanying drawings.

BRIEF DESCRIPTION OF THE DRAWINGS

Referring to FIG. 2, a unique push-pull inverter circuit is shown. A plurality of transistors 20-1 through 20-N are connected in series with the primary windings 22-1 through 22-N of the output transformer 21. An equal number of transistors 24-1 through 24-N are connected in series with the primary windings 26-1 through 26-N of output transformer 21. The mid-point of the two series arrangements are connected to the positive side of DC potential 28 at point 30. The ends of the two series connections, that is transistors 20-N and 24-N are connected to the negative side of potential source 28.

Each of the transistors 20-1 to 20-N and 24-1 to 24-N have turns of the secondary winding of the input transformer 30-1, 30-2, 30-N and 32-1, 32-2, 32-N connected across the emitter and base electrodes. The secondary windings 30-1, 30-2, 30-N and 32-1, 32-2, 32-N are coupled to the primary input winding 42 which is connected to an AC signal source 44. Except for transistors 20-N and 24-N, the transistors are connected through capacitors 34-1, 34-2 - - -, and 36-1, 36-2, etc. to the DC source 28. Resistor shunts 38-1, 38-2, 38-N and 40-1, 40-2, 40-N are connected across the emitter and collector electrodes of the transistors 20-1, 20-2, 20-N and 24-1, 24-2, 24-N respectively, for static voltage distribution.

Also, a "poled RC" network is connected across each of the primary output voltage windings 22-1 through 22-N and 26-1 through 26-N for dynamic voltage distribution. Each of the "poled RC" networks includes a diode in series with the winding (diodes 52-1 through 52-N and 54-1 through 54-N) and a resistor and capacitor connected in parallel with the winding and the diode (resistors 56-1 through 56-N and 58-1 through 58-N; capacitors 60-1 through 60-N and 62-1 through 62-N). Whenever the voltage across a transistor is larger than the voltage across the capacitor in the corresponding network, a current will flow into the relative AC short of the capacitor thereby charging it. As long as the excessive voltage occurs during a small fraction of the time that the transistor is open circuited (as determined by the RC time constant), the capacitor dissipates the charge into the resistor. The diode in series with the resistor and capacitor prevents discharge of the capacitor back into the transistor.

Dynamic voltage control can also be accomplished by replacing the diode with a Zener diode or by placing a Zener diode across the capacitor. Alternatively, a Zener diode may simply be placed across the resistor which is itself across the transistor. Still another way to achieve dynamic voltage control is to feedback a dynamic voltage bias to the base of the transistor. If the bias voltage is proportional to the voltage across the transistor, it will drive the transistor into saturation sooner and reduce the voltage build upon the capacitor.

Figure 1:
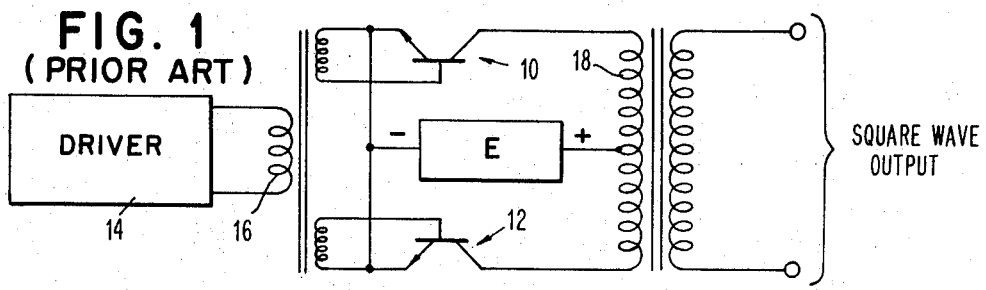
FIG. 1 is a schematic illustration of a prior art inverter circuit.
Figure 2:
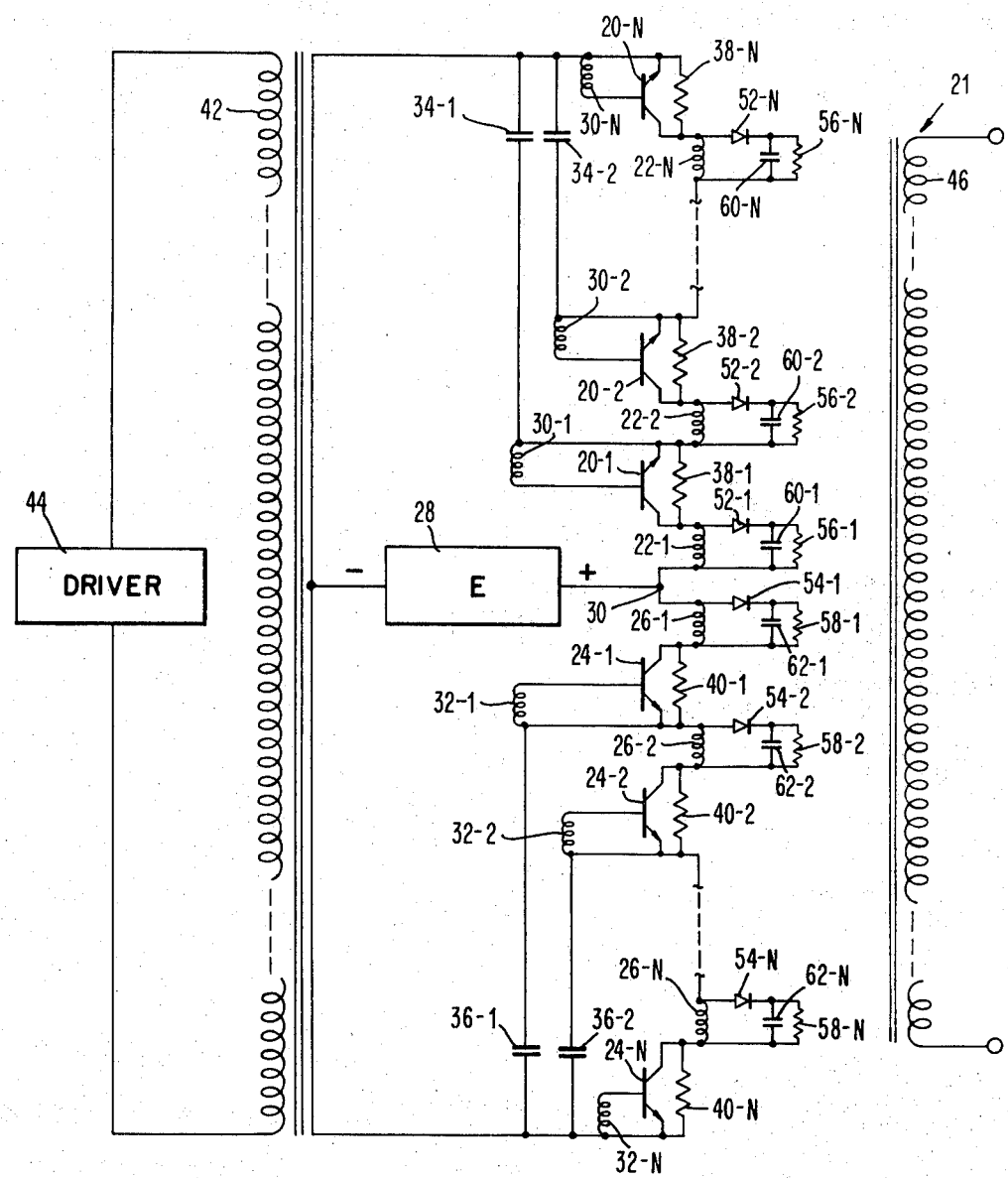
FIG. 2 is a schematic illustration of an embodiment of an inverter circuit according to the principles of the present invention.

The circuit of FIG. 2 operates in a push-pull fashion. During one-half cycle of the AC or other input signal, current flows between the base and emitter of transistors 20-1, 20-2, 20-N and they are driven up as far as saturation. Primary output windings 22-1, 22-2, 22-N and 26-1, 26-2, 26-N are coupled through a common core to secondary output winding 46.

Thus, during one-half cycle of the input signal from driver 44, transistors 20-1 through 20-N conduct and transistors 24-1 through 24-N are cut off (i.e., open circuits). The D.C. signal from source 28 is conducted through primary windings 22-1 through 22-N at output transformer 21 and produces an output voltage of a first polarity across the output winding 46. During the next half cycle of the input signal from source 44, transistors 24-1 through 24-N conduct and transistors 20-1 through 20-N are open circuits. The D.C. signal from source 28 is therefore conducted through primary windings 26-1 through 26-N of output transformer 21 and produces an output voltage of second polarity across output winding 46 of transformer 21.

Thus, an input signal from source 44, which may be in the order of 15 watts produces an inverted output signal which may be in the order of 5,000 watts. In the preferred embodiment, the input signal may be an A.C.

voltage or a square wave voltage. However, other forms of input signals are possible depending on the application of the circuit. Also, the circuit of FIG. 2 is shown as a push-pull circuit, however a single ended connection is possible.

An advantage of the present inverter employing a series string of transistors as the switching element is that the probability of catastrophic failure is reduced substantially, since if a transistor, the circuit element most susceptible to electrical circuit failure shorts, the remaining transistors divide the voltage amongst themselves and if an open circuit failure occurs, the leg in which the failure occurs simply stops operating.

For example, if each transistor has a probability of failure in a given time period F, and there are N transistors in series such that they distribute a given voltage E uniformly, for a voltage of E/N across each transistor, then the shorting of M of the N transistors results in the voltage redistributing among the remaining N—M transistors with each transistor voltage being E/(N—M), which is defined as just below the maximum permissible operating voltage. The probability of failure of a series string of transistors operating as a multi-transistor switch is given by the binomial expression $$F_G(N, M+1) = [ N!/(N-M-1)! (M-1)! ]F^{(M+1)}(1-F)^{(N-M-1)} \quad (1)$$

which is the probability of M+1 out of N transistors failing up to a given time after the beginning of operation. The failure of M+1 transistors produces E/(N—M—1) volts across the remaining transistors and thereby, certain failure of the group. Group probabilities of failure $F_G$ for increasing values of N which may be calculated from equation (1) show that for a given ratio $(M+1)BVN = \delta$, $F_G$ decreases as N increases in accordance with the expression $$F_G(4, 1) > F_G(8, 2) > F_G(16, 4) --- F_G(N, \delta N) \quad (2)$$

Thus, the reliability of a group of transistors in parallel increases more rapidly as their number increases. The above argument for a series string of transistor switches applies as long as there is a uniform static voltage across the transistors. This is accomplished in the present invention by the resistors 38–1 through 38–N and 40–1 through 40–N connected across the transistors such that the resistor string draws a small but finite fraction of the switched current.

Other advantages of the present invention are that the circuit may be embodied in relatively low power level integrated circuits for output powers beyond the usual integrated circuit components; the circuit is capable of relatively high frequency operation up to at least 100 kilohertz; the circuit uses inexpensive components and the transformers are used at high frequencies, avoiding the disadvantage of 60 Hertz transformation.

While the invention has been particularly shown and described with reference to the preferred embodiments thereof, it will be understood by those skilled in the art that various changes in form and detail may be made therein without departing from the spirit and scope of the invention.

What is claimed is:

1. A transistorized voltage inverter circuit comprising:
   an input signal source,
   an input transformer having a primary winding connected to said input signal source and a plurality of discrete sets of output windings,
   a plurality of transistors of even number N each having a base, a collector and an emitter electrode, each one of said transistors being driven by having its base and emitter electrodes connected across a separate one of said sets of output windings,
   an output transformer having a primary winding composed of a plurality of discrete sets of primary windings, each of said sets of primary windings being connected between separate ones of said plurality of transistors to form a series string, and a secondary output winding proximate to said sets of primary output windings in said series string,
   and a source of potential connected to the mid-point of said series string to form two series connected legs each having N/2 transistors, said input signal from said input signal source switching selected ones of said transistors on to provide a current path from said potential source through said switched transistors and through said sets of primary output windings connected between said switched transistors,
   said output secondary winding being responsive to the current through said sets of output primary windings to produce an output signal,
   and a separate capacitor connecting each of said sets of said output primary windings in each of said separate legs to a common point at the end of said legs.

* * * * *